United States Patent
Fujishita et al.

(10) Patent No.: US 12,291,644 B2
(45) Date of Patent: May 6, 2025

(54) URETHANE RESIN COMPOSITION AND LAYERED PRODUCT

(71) Applicant: DIC Corporation, Tokyo (JP)

(72) Inventors: Norie Fujishita, Takaishi (JP); Ryo Maeda, Takaishi (JP)

(73) Assignee: DIC Corporation, Tokyo (JP)

( * ) Notice: Subject to any disclaimer, the term of this patent is extended or adjusted under 35 U.S.C. 154(b) by 826 days.

(21) Appl. No.: 17/602,373

(22) PCT Filed: Apr. 7, 2020

(86) PCT No.: PCT/JP2020/015726
§ 371 (c)(1),
(2) Date: Oct. 8, 2021

(87) PCT Pub. No.: WO2020/246132
PCT Pub. Date: Dec. 10, 2020

(65) Prior Publication Data
US 2022/0169887 A1    Jun. 2, 2022

(30) Foreign Application Priority Data

Jun. 7, 2019   (JP) ................................ 2019-107056

(51) Int. Cl.
| | |
|---|---|
| C09D 175/08 | (2006.01) |
| C09D 5/02 | (2006.01) |
| C09D 7/20 | (2018.01) |
| C09D 7/45 | (2018.01) |
| C09D 7/63 | (2018.01) |
| C09D 7/65 | (2018.01) |
| C09D 175/06 | (2006.01) |
| D06N 3/00 | (2006.01) |
| D06N 3/14 | (2006.01) |

(52) U.S. Cl.
CPC ........... *C09D 175/08* (2013.01); *C09D 5/021* (2013.01); *C09D 7/20* (2018.01); *C09D 7/45* (2018.01); *C09D 7/63* (2018.01); *C09D 7/65* (2018.01); *C09D 175/06* (2013.01); *D06N 3/0043* (2013.01); *D06N 3/0059* (2013.01); *D06N 3/14* (2013.01); *D06N 2205/04* (2013.01)

(58) Field of Classification Search
CPC ... C09D 7/63; C09D 7/20; C09D 7/45; C09D 175/08; C09D 65/021; C09D 7/65; D06N 3/00; D06N 3/14

USPC .......................................................... 521/97
See application file for complete search history.

(56) References Cited

U.S. PATENT DOCUMENTS

| | | | |
|---|---|---|---|
| 2008/0299357 A1 | 12/2008 | Nakagawa et al. | |
| 2020/0240077 A1 | 7/2020 | Maeda et al. | |

FOREIGN PATENT DOCUMENTS

| | | | | |
|---|---|---|---|---|
| CN | 108587125 A | 9/2018 | | |
| JP | S58-87113 A | 5/1983 | | |
| JP | H11-323125 A | 11/1999 | | |
| JP | 2005-255968 A | 9/2005 | | |
| JP | 2007-191810 A | 8/2007 | | |
| JP | 2014-58654 A | 4/2014 | | |
| JP | 2018-90745 A | 6/2018 | | |
| KR | 10-0416414 B1 | 1/2004 | | |
| WO | 02/33001 A1 | 4/2002 | | |
| WO | WO-2016185803 A1 * | 11/2016 | | |
| WO | 2019/058693 A1 | 3/2019 | | |
| WO | WO-2019058692 A1 * | 3/2019 | ............. B32B 27/40 |
| WO | WO-2019098039 A1 * | 5/2019 | ......... B29C 44/5654 |

OTHER PUBLICATIONS

Office Action mailed Jun. 15, 2023, issued for KR10-2021-7031678 and English translation thereof.
Office Action dated Dec. 13, 2022, issued for CN202080036211.4 and English translation thereof.

* cited by examiner

*Primary Examiner* — Michael M. Bernshteyn
(74) *Attorney, Agent, or Firm* — Troutman Pepper Locke LLP; James E. Armstrong, IV; Nicholas J. DiGieglie, Jr.

(57) ABSTRACT

The present invention provides an urethane resin composition containing an urethane resin (A), water (B), and a film forming auxiliary (C), wherein the film forming auxiliary (C) is a polyethylene glycol (c1) and/or a polyethylene glycol (c2) having an alkoxy group having 11 or less carbon atoms. Further, the present invention provides a layered product having at least a substrate (i) and a foamed layer (ii) which is formed from the above-mentioned urethane resin composition. The polyethylene glycol (c1) and the polyethylene glycol (c2) preferably have a weight average molecular weight in the range of from 100 to 4,000. The urethane resin (A) preferably has an anionic group.

20 Claims, No Drawings

URETHANE RESIN COMPOSITION AND LAYERED PRODUCT

TECHNICAL FIELD

The present invention relates to an urethane resin composition.

BACKGROUND ART

Urethane resins have excellent mechanical strength and hand feeling, and are therefore widely used in the production of synthetic leather (including artificial leather). In this application, a solvent urethane resin containing N,N-dimethylformamide (DMF) has been mainly used. However, Europe regulates DMF, China and Taiwan strengthen the VOC emissions control, and the major apparel manufacturers regulate DMF, and, under the circumstances, the urethane resin composition used for layers constituting a synthetic leather is required to be free of DMF.

In this situation, an urethane dispersion (PUD) having an urethane resin dispersed in water is being studied as a substitute for a conventional solvent urethane resin that is a raw material for an intermediate porous layer of synthetic leather, which is formed by subjecting the solvent urethane resin to wet coagulation. With respect to this substitution, for imparting hand feeling and the like equivalent to those of a synthetic leather using a layer produced by wet film formation, the production of a foamed material from a PUD is energetically studied.

With respect to the method for obtaining the foamed material from a PUD, studies are made on, for example, a method of incorporating microcapsules into the PUD, and a mechanical foaming method of dispersing a gas, such as carbon dioxide, in a PUD blend (see, for example, PTL 1). However, the method of incorporating microcapsules has problems in that the obtained foamed material has poor hand feeling, and in that expansion of the microcapsules causes poor smoothness. Further, in the method of dispersing a gas, the bubbles generated in the PUD blend, for example, disappear during the process of producing a foamed material, and hence it is difficult to control the size of bubbles and the like, making it difficult to stably obtain a synthetic leather having excellent hand feeling.

Under the circumstances, in recent years, as a method for obtaining a foamed material with ease, a mechanical foaming method of foaming a PUD by stirring the PUD using a machine is studied. However, the mechanical foaming method has problems in that a crack is formed in the urethane film upon drying water in the PUD, so that the resultant film cannot stably exhibit hand feeling and physical properties, such as a peel strength and a flexing resistance.

CITATION LIST

Patent Literature

PTL 1: JP-A-2007-191810

SUMMARY OF INVENTION

Technical Problem

A task to be achieved by the present invention is to provide an urethane resin composition containing water, which is advantageous in that a film having excellent crack resistance can be formed from the composition even when mechanically foaming the composition.

Solution to Problem

The present invention provides an urethane resin composition containing an urethane resin (A), water (B), and a film forming auxiliary (C), wherein the film forming auxiliary (C) is a polyethylene glycol (c1) and/or a polyethylene glycol (c2) having an alkoxy group having 11 or less carbon atoms. Further, the present invention provides a layered product having at least a substrate (i) and a foamed layer (ii) which is formed from the above-mentioned urethane resin composition.

Advantageous Effects of Invention

The urethane resin composition of the present invention contains water and is environmentally friendly. Further, the urethane resin composition of the invention is advantageous in that a film having excellent crack resistance can be formed from the composition even when mechanically foaming the composition. Therefore, the urethane resin composition of the invention can be advantageously used as a material for a synthetic leather, and can be particularly advantageously used as a foamed layer for synthetic leather.

DESCRIPTION OF EMBODIMENTS

The urethane resin composition of the present invention contains an urethane resin (A), water (B), and a specific film forming auxiliary (C).

In the invention, it is necessary that the urethane resin composition contain the specific film forming auxiliary (C). By using the specific film forming auxiliary (C), when drying water in the urethane resin composition, the rate of volatilization of water can be lower and uniform, and it is presumed that, by virtue of this, the film formed from the composition can be suppressed in formation of a crack, achieving excellent hand feeling, peel strength, and the like of the film.

With respect to the film forming auxiliary (C), it is necessary that a polyethylene glycol (c1) and/or a polyethylene glycol (c2) having an alkoxy group having 11 or less carbon atoms be used as the film forming auxiliary (C).

From the viewpoint of obtaining still further excellent crack resistance, the alkoxy group in the polyethylene glycol (c2) preferably has 1 to 5 carbon atoms, more preferably 1 to 3 carbon atoms, further preferably 1 to carbon atoms, especially preferably one carbon atom (methoxy group). Further, the number of the alkoxy group or groups per molecule of the polyethylene glycol (c2) is in the range of from 1 to 2, preferably 1.

From the viewpoint of obtaining still further excellent crack resistance, the polyethylene glycol (c1) and the polyethylene glycol (c2) preferably have a weight average molecular weight in the range of from 100 to 4,000, more preferably in the range of from 100 to 3,000, further preferably in the range of from 400 to 2,000. The weight average molecular weight of the polyethylene glycol (c1) and the polyethylene glycol (c2) indicates a value measured by a gel permeation column chromatography (GPC) method.

The amount of the film forming auxiliary (C) used is preferably in the range of from 0.05 to 50 parts by mass, preferably in the range of from 0.1 to 20 parts by mass, relative to 100 parts by mass of the below-mentioned urethane resin (A) (=solids).

The urethane resin (A) can be dispersed in the below-mentioned water (B), and, for example, an urethane resin having a hydrophilic group, such as an anionic group, a cationic group, or a nonionic group; an urethane resin which is forcibly dispersed in the water (B) using an emulsifying agent, or the like can be used. These urethane resins may be used individually or in combination. Of these, from the viewpoint of the production stability and water dispersion stability, an urethane resin having a hydrophilic group is preferably used, and an urethane resin having an anionic group is more preferably used.

As a method for obtaining the urethane resin having an anionic group, for example, there can be mentioned a method using as a raw material at least one compound selected from the group consisting of a glycol compound having a carboxyl group and a compound having a sulfonyl group.

As the glycol compound having a carboxyl group, for example, 2,2-dimethylolpropionic acid, 2,2-dimethylolbutanoic acid, 2,2-dimethylolbutyric acid, 2,2-dimethylolpropionic acid, 2,2-valeric acid, or the like can be used. These compounds may be used individually or in combination.

As the compound having a sulfonyl group, for example, there can be used 3,4-diaminobutanesulfonic acid, 3,6-diamino-2-toluenesulfonic acid, 2,6-diaminobenzenesulfonic acid, N-(2-aminoethyl)-2-aminosulfonic acid, N-(2-aminoethyl)-2-aminoethylsulfonic acid, N-2-aminoethane-2-aminosulfonic acid, N-(2-aminoethyl)-β-alanine; a salt thereof, or the like. These compounds may be used individually or in combination.

When using the raw material for producing the urethane resin having an anionic group, from the viewpoint of obtaining still further excellent water dispersion stability, the amount of the raw material used is preferably in the range of from 0.1 to 5% by mass, more preferably in the range of from 0.5 to 4% by mass, further preferably in the range of from 1 to 3% by mass, based on the total mass of the raw materials for the urethane resin.

The carboxyl group and sulfonyl group may be neutralized partially or entirely with a basic compound in the urethane resin composition. As the basic compound, for example, there can be used ammonia; an organic amine, such as triethylamine, pyridine, or morpholine; an alkanolamine, such as monoethanolamine or dimethylethanolamine; a metal basic compound containing sodium, potassium, lithium, calcium, or the like; or the like.

As a method for obtaining the urethane resin having a cationic group, for example, there can be mentioned a method using one or two or more compounds having an amino group as a raw material.

As the compound having an amino group, for example, there can be used a compound having a primary or secondary amino group, such as triethylenetetramine or diethylenetriamine; a compound having a tertiary amino group, e.g., an N-alkyldialkanolamine, such as N-methyldiethanolamine or N-ethyldiethanolamine, or an N-alkyldiaminoalkylamine, such as N-methyldiaminoethylamine or N-ethyldiaminoethylamine; or the like. These compounds may be used individually or in combination.

As the emulsifying agent which can be used for obtaining the urethane resin forcibly dispersed in the water (B), for example, there can be used a nonionic emulsifying agent, such as polyoxyethylene nonylphenyl ether, polyoxyethylene lauryl ether, polyoxyethylene styrylphenyl ether, polyoxyethylene sorbitol tetraoleate, or a polyoxyethylene-polyoxypropylene copolymer; an anionic emulsifying agent, such as a fatty acid salt, e.g., sodium oleate, an alkylsulfate salt, an alkylbenzenesulfonic acid salt, an alkylsulfosuccinic acid salt, a naphthalanesulfonic acid salt, a polyoxyethylene alkylsulfuric acid salt, an alkaneslfonate sodium salt, or an alkyl diphenyl ether sulfonic acid sodium salt; a cationic emulsifying agent, such as an alkylamine salt, an alkyltrimethylammonium salt, or an alkyldimethylbenzylammonium salt, or the like. These emulsifying agents may be used individually or in combination.

With respect to the urethane resin (A), specifically, for example, a reaction product of a polyisocyanate (a1), a polyol (a2), and a raw material used for producing the above-mentioned urethane resin having a hydrophilic group can be used.

As the polyisocyanate (a1), for example, there can be used an aromatic polyisocyanate, such as phenylene diisocyanate, toluene diisocyanate, diphenylmethane diisocyanate, xylylene diisocyanate, naphthalene diisocyanate, polymethylene polyphenyl polyisocyanate, or carbodiimidated diphenylmethane polyisocyanate; an aliphatic polyisocyanate or alicyclic polyisocyanate, such as hexamethylene diisocyanate, lysine diisocyanate, cyclohexane diisocyanate, isophorone diisocyanate, dicyclohexylmethane diisocyanate, xylylene diisocyanate, tetramethylxylylene diisocyanate, dimer acid diisocyanate, or norbornene diisocyanate, or the like. These polyisocyanates may be used individually or in combination.

From the viewpoint of the production stability and mechanical physical properties of the obtained film, the amount of the polyisocyanate (a1) used is preferably in the range of from 5 to 40% by mass, more preferably in the range of from 10 to 30% by mass, based on the total mass of the raw materials for the urethane resin (A).

As the polyol (a2), for example, polyether polyol, polyester polyol, polyacryl polyol, polycarbonate polyol, polybutadiene polyol, or the like can be used. These polyols may be used individually or in combination.

From the viewpoint of the mechanical strength of the obtained film, the polyol (a2) preferably has a number average molecular weight in the range of from 500 to 50,000, more preferably in the range of from 800 to 10,000. The number average molecular weight of the polyol (a2) indicates a value measured by a gel permeation column chromatography (GPC) method.

In the polyol (a2), if necessary, a chain extender (a2-1) having a number average molecular weight of less than 500 (preferably in the range of from 50 to 450) may be used. As the chain extender (a2-1), for example, there can be used a chain extender having a hydroxyl group, such as ethylene glycol, diethylene glycol, triethylene glycol, propylene glycol, dipropylene glycol, 1,3-propanediol, 1,3-butanediol, 1,4-butanediol, hexamethylene glycol, saccharose, methylene glycol, glycerol, sorbitol, bisphenol A, 4,4'-dihydroxydiphenyl, 4,4f-dihydroxydiphenyl ether, or trimethylolpropane; a chain extender having an amino group, such as ethylenediamine, 1,2-propanediamine, 1,6-hexamethylenediamine, piperazine, 2,5-dimethylpiperazine, isophoronediamine, 1,2-cyclohexanediamine, 1,3-cyclohexanediamine, 1,4-cyclohexanediamine, 4,4f-dicyclohexylmethanediamine, 3,3'-dimethyl-4,4'-dicyclohexylmethanediamine, 1,4-cyclohexanediamine, or hydrazine; or the like. These chain extenders may be used individually or in combination.

When the chain extender (a2-1) is used, from the viewpoint of the mechanical strength of the obtained film, the amount of the chain extender (a2-1) used is preferably in the range of from 0.5 to 5% by mass, more preferably in the range of from 1 to 3% by mass, based on the total mass of the raw materials for the urethane resin (A).

With respect to the method for producing the urethane resin (A), for example, there can be mentioned a method in which the polyol (a2), the raw material for producing the urethane resin having a hydrophilic group, the chain extender (a2-1), and the polyisocyanate (a1) are charged at the same time and subjected to reaction. The reaction is conducted, for example, at 50 to 100° C. for 3 to 10 hours.

In producing the urethane resin (A), the molar ratio of the isocyanate group of the polyisocyanate (a1) to the total of the hydroxyl group of the polyol (a2), the hydroxyl group and amino group of the raw material used for producing the urethane resin having a hydrophilic group, and the hydroxyl group and amino group of the chain extender (a2-1) [isocyanate group/(hydroxyl group and amino group)] is preferably in the range of from 0.8 to 1.2, more preferably in the range of from 0.9 to 1.1.

In producing the urethane resin (A), it is preferred that the isocyanate group remaining in the urethane resin (A) is deactivated. When deactivating the isocyanate group, an alcohol having a hydroxyl group, such as methanol, is preferably used. The amount of the alcohol used is preferably in the range of from 0.001 to 10 parts by mass, relative to 100 parts by mass of the urethane resin (A).

Further, when producing the urethane resin (A), an organic solvent may be used. As the organic solvent, for example, there can be used a ketone compound, such as acetone or methyl ethyl ketone; an ether compound, such as tetrahydrofuran or dioxane; an acetate compound, such as ethyl acetate or butyl acetate; a nitrile compound, such as acetonitrile; an amide compound, such as dimethylformamide or N-methylpyrrolidone; or the like. These organic solvents may be used individually or in combination. It is preferred that the organic solvent is finally removed by a distillation method or the like.

From the viewpoint of stably retaining the foam generated by the below-mentioned mechanical foaming and causing the density of the foamed layer (ii) to be in a preferred range so as to stably obtain excellent hand feeling, the flow starting temperature of the urethane resin (A) is preferably 80° C. or higher, more preferably in the range of from 80 to 220° C.

As a method for controlling the flow starting temperature of the urethane resin (A), there can be mentioned a below-mentioned method of controlling the flow starting temperature by mainly the type of the polyol (a2) which is the raw material for the urethane resin (A), the amount of the chain extender (a2-1) used, and the type of the polyisocyanate (a1). As a method of controlling the flow starting temperature to be higher, for example, there can be mentioned the use of a highly crystalline polyol, such as polycarbonate polyol, as the polyol (a2), an increase of the amount of the chain extender (a2-1) used, and the use of a highly crystalline polyisocyanate, such as 4,4'-diphenylmethane diisocyanate or dicyclohexylmethane diisocyanate, as the polyisocyanate (a1). Further, as a method of controlling the flow starting temperature to be lower, for example, there can be mentioned the use of a poorly crystalline polyol, such as polyoxypropylene glycol, as the polyol (a2), a reduction of the amount of the chain extender (a2-1) used, and the use of a poorly crystalline polyisocyanate, such as toluene diisocyanate or isophorone diisocyanate, as the polyisocyanate (a1). Accordingly, the flow starting temperature of the urethane resin (A) can be controlled by appropriately selecting a method from these methods.

As a method for measuring the flow starting temperature of the urethane resin (A), for example, there can be mentioned a method in which the urethane resin composition is applied to release paper (thickness of the applied composition: 150 μm), and dried by means of a hot-air dryer at 70° C. for 4 minutes and further at 120° C. for 2 minutes to obtain a dried material, and, with respect to the obtained dried material, a flow starting temperature is measured using Flow Tester "CFT-500A", manufactured by Shimadzu Corporation (using a dice having a bore diameter of 1 mm and a length of 1 mm; load: 98 N; temperature increase rate: 3° C./minute).

As the water (B), for example, ion-exchanged water, distilled water, tap water, or the like can be used. Of these, ion-exchanged water having less impurities is preferably used. From the viewpoint of the working properties, application properties, and storage stability, the amount of the water (B) contained is preferably in the range of from 20 to 90% by mass, more preferably in the range of from 40 to 80% by mass, based on the mass of the urethane resin composition.

From the viewpoint of the water dispersion stability and working properties, the mass ratio of the urethane resin (A) to the water (B) [(A)/(B)] is preferably in the range of from 5/95 to 70/30, more preferably in the range of from 10/90 to 60/40.

The urethane resin composition of the invention contains the above-mentioned urethane resin (A), water (B), and film forming auxiliary (C) as essential components, but may contain an additional additive if necessary.

With respect to the additional additive, for example, there can be used a surfactant (D), a crosslinking agent, a neutralizing agent, a thickener, an urethane-forming reaction catalyst, a filler, a pigment, a dye, a flame retardant, a leveling agent, an anti-blocking agent, or the like. These additives may be used individually or in combination.

With respect to the surfactant (D), from the viewpoint of preventing the foam generated by mechanical foaming from disappearing so as to obtain further excellent crack resistance and hand feeling, a surfactant (D) having a hydrophobic portion having 10 or more carbon atoms is preferably used.

As the surfactant (D), for example, a surfactant represented by the formula (2) below; a fatty acid salt, a succinic acid salt, a sulfosuccinic acid salt, an octadecylsulfosuccinic acid salt, a sulfosuccinic acid ester, or the like can be used. These surfactants may be used individually or in combination.

[Chem. 1]

$$RCO_2^- X^+ \qquad (2)$$

Wherein, in the formula (2), R represents a linear or branched alkyl group having 10 to 20 carbon atoms, and X represents Na, K, $NH_4$, morpholine, ethanolamine, or triethanolamine.

With respect to the surfactant (D), among those mentioned above, from the viewpoint of obtaining still further excellent retention of foam, the surfactant represented by the formula (2) above is preferably used, and the surfactant having a linear alkyl group having 13 to 19 carbon atoms is more preferably used, and a stearic acid salt is especially preferably used.

When the surfactant (D) is used, from the viewpoint of obtaining still further excellent retention of foam, the amount of the surfactant (D) used is preferably in the range of from 0.01 to 30 parts by mass, more preferably in the range of from 0.1 to 20 parts by mass, relative to 100 parts by mass of the urethane resin (A) (=solids).

The crosslinking agent is used for the purpose of improving the mechanical strength of a foamed layer (ii) and the like, and, for example, a polyisocyanate crosslinking agent, an epoxy crosslinking agent, a melamine crosslinking agent, an oxazoline crosslinking agent, or the like can be used. These crosslinking agents may be used individually or in combination. When the crosslinking agent is used, the amount of the crosslinking agent used is, for example, preferably in the range of from 0.01 to 100 parts by mass, more preferably in the range of from 0.1 to 50 parts by mass, further preferably in the range of from 0.5 to 30 parts by mass, relative to 100 parts by mass of the urethane resin (A) (=solids).

The layered product of the invention is described below.

The layered product has at least a substrate (i) and a foamed layer (ii) which is formed from the above-described urethane resin composition.

As the substrate (i), for example, there can be used a fiber substrate, such as nonwoven fabric, woven fabric, or knitted fabric, each formed from a polyester fiber, a polyethylene fiber, a nylon fiber, an acrylic fiber, a polyurethane fiber, an acetate fiber, a rayon fiber, a polylactate fiber, cotton, linen, silk, wool, a glass fiber, a carbon fiber, a mixed fiber thereof, or the like; the above-mentioned nonwoven fabric which is impregnated with a resin, such as a polyurethane resin; the above-mentioned nonwoven fabric which has further formed thereon a porous layer; a resin substrate, such as a thermoplastic urethane (TPU), or the like.

A method for producing the layered product of the invention is described below.

As a method for producing the layered product, for example, there can be mentioned:

(X) a method in which the urethane resin composition is foamed to obtain a foamed liquid, and the obtained foamed liquid is applied onto release paper, and dried, and bonded to the above-mentioned substrate (i), (Y) a method in which the urethane resin composition is foamed to obtain a foamed liquid, and the obtained foamed liquid is applied onto a skin layer formed on release paper, and dried, and bonded to the substrate (i), and (Z) a method in which the urethane resin composition is foamed to obtain a foamed liquid, and the obtained foamed liquid is applied onto the substrate (i), and dried, and, if necessary, a skin layer (iii) formed on release paper is bonded onto the resultant substrate.

As a method for foaming the urethane resin composition to obtain a foamed liquid, for example, there can be mentioned manual stirring, and mechanical foaming using a mixer, such as a mechanical mixer. Of these, from the viewpoint of obtaining a foamed liquid with ease, a method using a mixer is preferred. When using a mixer, for example, there can be mentioned a method in which the urethane resin composition is stirred at 500 to 3,000 rpm for 10 seconds to 10 minutes. In this case, from the viewpoint of obtaining the foamed layer (ii) having excellent hand feeling, the foamed liquid obtained after foaming preferably has a volume 1.3 to 7 times, more preferably 1.2 to 2 times the volume of the urethane resin composition before being foamed.

As a method for applying the obtained foamed liquid to the substrate (i) or the like, for example, there can be mentioned a method using a roll coater, a knife coater, a comma coater, an applicator, or the like.

As a method for drying the applied material, for example, there can be mentioned a method in which the applied material is dried at a temperature of 60 to 130° C. for 30 seconds to 10 minutes.

The foamed layer (ii) obtained by the above-mentioned method has a thickness of, for example, 5 to 300 μm.

From the viewpoint of obtaining still further excellent hand feeling, the foamed layer (ii) preferably has a density of 200 to 1,000 kg/m$^3$, more preferably in the range of from 400 to 800 kg/m$^3$. The density of the foamed layer (ii) indicates a value determined by dividing a value, which is obtained by subtracting the weight of the substrate (i) 10 cm square from the weight of the layered product 10 cm square, by the thickness of the foamed layer (ii).

The skin layer (iii) can be formed by a known method from a known material, and, for example, a solvent urethane resin, an aqueous urethane resin, a silicone resin, a polypropylene resin, a polyester resin, or the like can be used. In the case of particularly achieving soft hand feeling and excellent heat resistance and hydrolytic resistance, a polycarbonate urethane resin is preferably used. Further, for reducing the use of DMF to protect the environment, an aqueous polycarbonate urethane resin is more preferably used.

On the skin layer (iii), if necessary, a surface treatment layer (iv) may be further formed for the purpose of improving the marring resistance and imparting gloss and the like. The surface treatment layer (iv) can be formed by a known method from a known material.

As described above, the urethane resin composition of the invention contains water and is environmentally friendly. Further, the urethane resin composition of the invention is advantageous in that a film having excellent crack resistance can be formed from the composition even when mechanically foaming the composition. Therefore, the urethane resin composition of the invention can be advantageously used as a material for a synthetic leather, and can be particularly advantageously used as a foamed layer for synthetic leather.

EXAMPLES

Hereinbelow, the present invention will be described in more detail with reference to the following Examples.

Example 1

To 100 parts by mass of a polyether polyurethane dispersion ("HYDRAN WLS-120AR", manufactured by DIC Corporation; solids content: 50% by mass; hereinafter, abbreviated to "PUD (A-1)") were added 2 parts by mass of a thickener ("Borch Gel ALA", manufactured by Borchers GmbH), 2 parts by mass of ammonium stearate, 4 parts by mass of a crosslinking agent ("CARBODILITE SV-02", manufactured by Nisshinbo Chemical Inc.), and 5 parts by mass of methoxypolyethylene glycol ("UNIOX M-550", manufactured by NOF Corporation; weight average molecular weight: 550; hereinafter, abbreviated to "Methoxy PEG (1)"), and the resultant mixture was stirred using a mechanical mixer at 2,000 rpm so that the mixture contained air therein, obtaining a foamed liquid having a volume 1.5 times the initial volume.

The obtained foamed liquid was applied to release paper, and dried at 80° C. for 3 minutes to form an urethane foamed layer having a thickness of 300 μm, and the formed layer was bonded to polyester fiber nonwoven fabric to obtain a synthetic leather.

Examples 2 to 5 and Comparative Example 1

Synthetic leathers were individually obtained in substantially the same manner as in Example 1 except that the type of the urethane resin (A) used and the type and/or amount of the film forming auxiliary (C) used were changed as shown in Table 1.

[Method for Measuring a Number Average Molecular Weight and a Weight Average Molecular Weight]

The weight average molecular weight and the like of the film forming auxiliary (C) are values as measured by a gel permeation chromatography (GPC) method under the conditions shown below.

Measuring apparatus: High-speed GPC apparatus ("HLC-8220GPC", manufactured by Tosoh Corp.)
Columns: The columns shown below, manufactured by Tosoh Corp., which are connected in series were used.
"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1
Detector: RI (differential refractometer)
Column temperature: 40° C.
Eluent: Tetrahydrofuran (THF)
Flow rate: 1.0 mL/minute
Sample amount per injection: 100 μL (tetrahydrofuran solution having a sample concentration of 0.4% by mass)
Standard sample: A calibration curve was prepared using the standard polystyrenes shown below.
(Standard Polystyrenes)
"TSKgel standard polystyrene A-500", manufactured by Tosoh Corp.
"TSKgel standard polystyrene A-1000", manufactured by Tosoh Corp.
"TSKgel standard polystyrene A-2500", manufactured by Tosoh Corp.
"TSKgel standard polystyrene A-5000", manufactured by Tosoh Corp.
"TSKgel standard polystyrene F-1", manufactured by Tosoh Corp.
"TSKgel standard polystyrene F-2", manufactured by Tosoh Corp.
"TSKgel standard polystyrene F-4", manufactured by Tosoh Corp.
"TSKgel standard polystyrene F-10", manufactured by Tosoh Corp.
"TSKgel standard polystyrene F-20", manufactured by Tosoh Corp.
"TSKgel standard polystyrene F-40", manufactured by Tosoh Corp.
"TSKgel standard polystyrene F-80", manufactured by Tosoh Corp.
"TSKgel standard polystyrene F-128", manufactured by Tosoh Corp.
"TSKgel standard polystyrene F-288", manufactured by Tosoh Corp.
"TSKgel standard polystyrene F-550", manufactured by Tosoh Corp.

[Evaluation Method for Crack Resistance]

The synthetic leather obtained in each of the Examples and Comparative Example was observed in respect of the appearance to check whether a crack was formed or not. A synthetic leather having no crack was rated "T", and a synthetic leather in which a crack was found was rated "F".

[Evaluation Method for Hand Feeling]

The synthetic leather obtained in each of the Examples and Comparative Example was touched by hands, and evaluated according to the following criteria.
"T": Flexible and elastic.
"F": Poorly flexible and hard.

[Evaluation Method for Peel Strength]

With respect to the synthetic leather obtained in each of the Examples and Comparative Example, a hot-melt tape having a width of 2.5 cm ("BW-2", manufactured by San Chemicals, Ltd.) was placed on the surface of the synthetic leather, and heated at 150° C. for 30 seconds so that the hot-melt tape was bonded to the synthetic leather. A specimen having the width of the hot-melt tape was cut. A part of the specimen was peeled, and the substrate and the hot-melt tape were held by chucks, and, using Shimadzu Autograph "AG-1" (manufactured by Shimadzu Corporation), a peel strength was measured under conditions such that the full scale was 5 kg and the head speed was 20 mm/minute, and the measured value was converted to a value per 1 cm width. A specimen having a peel strength of 3 kgf/cm or more was rated "T", and a specimen having the other value of peel strength was rated "F".

TABLE 1

| | Example 1 | Example 2 | Example 3 | Example 4 | Example 5 | Comparative Example 1 |
|---|---|---|---|---|---|---|
| Urethane resin (A) | PUD (A-1) | PUD (A-1) | PUD (A-2) | PUD (A-3) | PUD (A-1) | PUD (A-1) |
| Film forming auxiliary (C) | Methoxy PEG (1) | Methoxy PEG (2) | Methoxy PEG (1) | PEG (1) | PEG (2) | |
| Weight average molecular weight | 550 | 1000 | 550 | 400 | 1000 | |
| Amount of (C) used (relative to 100 parts by mass of (A) (solids)) | 10 | 10 | 15 | 10 | 8 | 0 |
| Evaluation of crack resistance | T | T | T | T | T | F |
| Evaluation of hand feeling | T | T | T | T | T | F |
| Evaluation of peel strength | T | T | T | T | T | F |

The abbreviations shown in Table 1 are as follows.
"PUD (A-2)": Polycarbonate polyurethane dispersion ("HYDRAN WLS-110AR", manufactured by DIC Corporation; solids content: 50% by mass)
"PUD (A-3)": Ester polyurethane dispersion ("HYDRAN ADS-110", manufactured by DIC Corporation; solids content: 50% by mass)
"Methoxy PEG (2)": Methoxy PEG (weight average molecular weight: 1,000)
"PEG (1)": Polyethylene glycol (weight average molecular weight: 400)
"PEG (2)": Polyethylene glycol (weight average molecular weight: 1,000).

It was found that, in Examples 1 to 5 which correspond to the urethane resin composition of the present invention, a synthetic leather having excellent crack resistance, hand feeling, and peel strength was obtained.

On the other hand, in Comparative Example 1 which corresponds to an embodiment in which the film forming auxiliary (C) is not used, all the crack resistance, hand feeling, and peel strength were poor.

The invention claimed is:

1. A urethane resin composition containing a urethane resin (A), water (B), and a film forming auxiliary (C), wherein the film forming auxiliary (C) is a polyethylene glycol (c1) and/or a polyethylene glycol (c2) having an alkoxy group having 11 or less carbon atoms; and wherein the film forming auxiliary (C) is present in a range of from 0.05 to 50 parts by mass relative to 100 parts by mass of the urethane resin (A).

2. The urethane resin composition according to claim 1, wherein the polyethylene glycol (c1) and the polyethylene glycol (c2) have a weight average molecular weight in the range of from 100 to 4,000.

3. The urethane resin composition according to claim 1, wherein the urethane resin (A) has an anionic group.

4. The urethane resin composition according to claim 1, further containing a surfactant (D) having a hydrophobic portion having 10 or more carbon atoms.

5. The urethane resin composition according to claim 4, wherein the surfactant (D) is a stearic acid salt.

6. A layered product having at least a substrate (i) and a foamed layer (ii) which is formed from the urethane resin composition according to claim 1.

7. The layered product according to claim 6, wherein the foamed layer (ii) is formed by mechanically foaming the urethane resin composition.

8. The urethane resin composition according to claim 2, wherein the urethane resin (A) has an anionic group.

9. The urethane resin composition according to claim 2, further containing a surfactant (D) having a hydrophobic portion having 10 or more carbon atoms.

10. The urethane resin composition according to claim 3, further containing a surfactant (D) having a hydrophobic portion having 10 or more carbon atoms.

11. The urethane resin composition according to claim 8, further containing a surfactant (D) having a hydrophobic portion having 10 or more carbon atoms.

12. The urethane resin composition according to claim 9, wherein the surfactant (D) is a stearic acid salt.

13. The urethane resin composition according to claim 10, wherein the surfactant (D) is a stearic acid salt.

14. The urethane resin composition according to claim 11, wherein the surfactant (D) is a stearic acid salt.

15. A layered product having at least a substrate (i) and a foamed layer (ii) which is formed from the urethane resin composition according to claim 2.

16. A layered product having at least a substrate (i) and a foamed layer (ii) which is formed from the urethane resin composition according to claim 3.

17. A layered product having at least a substrate (i) and a foamed layer (ii) which is formed from the urethane resin composition according to claim 4.

18. A layered product having at least a substrate (i) and a foamed layer (ii) which is formed from the urethane resin composition according to claim 5.

19. A layered product having at least a substrate (i) and a foamed layer (ii) which is formed from the urethane resin composition according to claim 8.

20. A layered product having at least a substrate (i) and a foamed layer (ii) which is formed from the urethane resin composition according to claim 9.

* * * * *